United States Patent
Stanton et al.

(10) Patent No.: US 11,475,201 B2
(45) Date of Patent: Oct. 18, 2022

(54) INCLUSION OF STOCHASTIC BEHAVIOR IN SOURCE MASK OPTIMIZATION

(71) Applicant: Synopsys, Inc., Mountain View, CA (US)

(72) Inventors: William Stanton, Meridian, ID (US); Sylvain Berthiaume, Ottawa (CA); Lawrence S. Melvin, III, Hillsboro, OR (US); Ulrich Klostermann, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/183,291

(22) Filed: Feb. 23, 2021

(65) Prior Publication Data

US 2021/0263405 A1    Aug. 26, 2021

Related U.S. Application Data (60) Provisional application No. 62/980,923, filed on Feb. 24, 2020.

(51) Int. Cl.
*G06F 30/398* (2020.01)
*G03F 7/20* (2006.01)
(Continued)

(52) U.S. Cl.
CPC .............. *G06F 30/398* (2020.01); *G03F 1/36* (2013.01); *G03F 1/70* (2013.01); *G03F 7/705* (2013.01);
(Continued)

(58) Field of Classification Search
None
See application file for complete search history.

(56) References Cited

U.S. PATENT DOCUMENTS

| 7,378,202 | B2 | 5/2008 | Granik et al. |
| 8,849,008 | B2 | 9/2014 | Zhou et al. |

(Continued)

FOREIGN PATENT DOCUMENTS

WO    WO-2021062040 A1    4/2021

OTHER PUBLICATIONS

Biafore et al., J. J., "Statistical simulation of resist at EUV and ArF," Proc. SPIE 7273, Advances in Resist Materials and Processing Technology XXVI, SPIE Advanced Lithograph, Apr. 1, 2009, San Jose, CA, 11 pp.

(Continued)

*Primary Examiner* — Leigh M Garbowski
(74) *Attorney, Agent, or Firm* — Weaver Austin Villeneuve & Sampson LLP (57) ABSTRACT

A method of generating a mask used in fabrication of a semiconductor device includes, in part, selecting a source candidate, generating a process simulation model that includes a stochastic variance band model in response to the selected source candidate, performing a first optical proximity correction (OPC) on the data associated with the mask in response to the process simulation model, assessing one or more lithographic evaluation metrics in response to the OPC mask data, computing a cost in response to the assessed one or more lithographic evaluation metrics, and determining whether the computed cost satisfies a threshold condition. In response to the determination that the computed cost does not satisfy the threshold condition, a different source candidate may be selected.

20 Claims, 9 Drawing Sheets

(51) Int. Cl.
*G03F 1/36* (2012.01)
*G03F 1/70* (2012.01)
*G06F 119/18* (2020.01)
*G06F 111/08* (2020.01)

(52) U.S. Cl.
CPC ...... *G03F 7/70441* (2013.01); *G06F 2111/08* (2020.01); *G06F 2119/18* (2020.01)

(56) References Cited

U.S. PATENT DOCUMENTS

| | | | | |
|---|---|---|---|---|
| 9,934,346 | B2* | 4/2018 | Hansen | G03F 1/70 |
| 10,599,046 | B2* | 3/2020 | Kim | G06F 30/3323 |
| 11,061,373 | B1* | 7/2021 | Khaira | G05B 13/0265 |
| 11,079,687 | B2* | 8/2021 | Slachter | G03F 7/705 |
| 2021/0018850 | A1 | 1/2021 | Slachter et al. | |
| 2021/0263404 | A1 | 8/2021 | Kandel et al. | |
| 2021/0263407 | A1 | 8/2021 | Levinson et al. | |
| 2021/0264091 | A1* | 8/2021 | Stanton | G06F 30/398 |

OTHER PUBLICATIONS

De Bisschop et al., P., "Stochastic Printing Failures in EUV Lithography," Proc. SPIE 10957, Extreme Ultraviolet (EUV) Lithography X, SPIE Advanced Lithography, Mar. 26, 2019, San Jose, CA, 21 pp.

Ex Parte Quayle Action dated Mar. 28, 2022 issued in U.S. Appl. No. 17/182,135.

Jonckheere, R., et al., "Stochastic printing behavior of ML-defects on EUV mask," Proc. SPIE 11147, Int'l Conference on Extreme Ultraviolet Lithography, Oct. 24, 2019, SPIE Photomask Technology + EUV Lithography, Monterey, CA, 14 pp.

Kim et al., S.-M., "Understanding of stochastic noise," Proc. SPIE 9422, Extreme Ultraviolet (EUV) Lithography VI, SPIE Advanced Lithography, Apr. 7, 2015, San Jose, CA, 12 pp.

Lucas, K., et al., "Exploration of compact and rigorous simulation-based methods to reduce stochastic failure risk," EUV Workshop, 2019 Synopsys, Inc., 23 pp.

Maslow, M. J., et al., "Impact of Local Variability on Defect-Aware Process Windows," Proc. SPIE 10957, Extreme Ultraviolet (EUV) Lithography X, SPIE Advanced Lithography, Mar. 26, 2019, San Jose, CA, 16 pp.

P. De Bisschop, "Stochastic effects in EUV lithography: random, local CD variability, and printing failures," J. Micro/Nanolithography, MEMS, MOEMS, vol. 16, No. 4, pp. 041013-1-041013-17, Oct.-Dec. 2017.

U.S. Notice of Allowance dated Jun. 9, 2022 in U.S. Appl. No. 17/182,135.

U.S. Office Action dated Feb. 1, 2022 issued in U.S. Appl. No. 17/184,521.

Wintz et al., D. T., "Photon flux requirements for extreme ultraviolet reticle imaging in the 22-and 16-nm nodes," J. Micro/Nanolith. MEMS MOEMS vol. 9, No. 4, Oct.-Dec. 2010, 8 pp.

U.S. Final office Action dated Jun. 17, 2022 in U.S. Appl. No. 17/184,521.

* cited by examiner

INCLUSION OF STOCHASTIC BEHAVIOR IN SOURCE MASK OPTIMIZATION

RELATED APPLICATION

The present application claims benefit under 35 USC 119(e) of U.S. Application Ser. No. 62/980,923, filed Feb. 24, 2020, entitled "Inclusion Of Stochastic Behavior In Source Mask Optimization", the content of which is incorporated herein by reference in its entirety.

TECHNICAL FIELD

The present disclosure relates to masks and optical sources used during the fabrication of semiconductor devices, and more particularly to applying stochastic models in optimizing such masks and optical sources.

BACKGROUND

Extreme Ultraviolet (EUV) Lithography is the primary patterning method for fabricating 20 nm and smaller dimensions during the manufacture of semiconductor devices. Source Mask Optimization (SMO) accounts for hardware tools from deep ultraviolet (DUV) to EUV scanners, and for process characteristics (mask and wafer processing) so as to generate an optimum source illumination, masks, and wafer yield. Applying simulation tools in the SMO flows has become a common practice to enhance lithography resolution, provide robust imaging of smaller features, and improve yield.

BRIEF SUMMARY

A method of generating a mask used in fabrication of a semiconductor device includes, in part, selecting a source candidate, generating a process simulation model that includes a stochastic variance band model in response to the selected source candidate, performing a first optical proximity correction (OPC) on the data associated with the mask in response to the process simulation model, assessing one or more lithographic evaluation metrics in response to the OPC mask data, computing a cost in response to the assessed one or more lithographic evaluation metrics, and determining whether the computed cost satisfies a threshold condition. In response to the determination that the computed cost does not satisfy the threshold condition, a different source candidate is selected.

A non-transitory computer readable storage medium includes instructions which when executed by a processor cause the processor to select a source candidate, generate a process simulation model that includes a stochastic variance band model in response to the selected source candidate, perform a first optical proximity correction (OPC) on the data associated with the mask in response to the process simulation model, assess one or more lithographic evaluation metrics in response to the OPC mask data, compute a cost in response to the assessed one or more lithographic evaluation metrics, determine whether the computed cost satisfies a threshold condition, and in response to the determination that the computed cost does not satisfy the threshold condition, select a second source candidate.

A system includes, in part, a memory configured to store instructions; and a processor, coupled with the memory and configured to execute the instructions. The instructions when executed causing the processor to select a source candidate, generate a process simulation model comprising a stochastic variance band model in response to the selected source candidate, perform a first optical proximity correction (OPC) on data associated with the mask in response to the process simulation model, assess one or more lithographic evaluation metrics in response to the OPC mask data, compute a cost in response to the assessed one or more lithographic evaluation metrics, determine whether the computed cost satisfies a threshold condition, and in response to the determination that the computed cost does not satisfy the threshold condition, select a second source candidate.

BRIEF DESCRIPTION OF DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Conventional SMO flows used in DUV or EUV processes focus on the Normalized Image Log Slope (NILS) during the optimization to account for DUV or EUV defectivity. Conventional SMO flows, however, do not factor in stochastic processes occurring in, for example, DUV or EUV scanners, wafers, masks, photon shot noise present in the path of the photon to a wafer, secondary electron paths, quencher, inhibitor initial distribution, as well as random kinetic paths taken during the photoresist bake and development processes. Conventional SMO flows are therefore insufficient in overcoming the challenges posed by advanced lithography processes.

In accordance with one embodiment of the present disclosure, stochastic variables defining a stochastic variable band are used as input parameters to a model generator module, an assessment module, and a cost function optimizer module in the flow to optimize the mask and the optical source.

Figure 1:
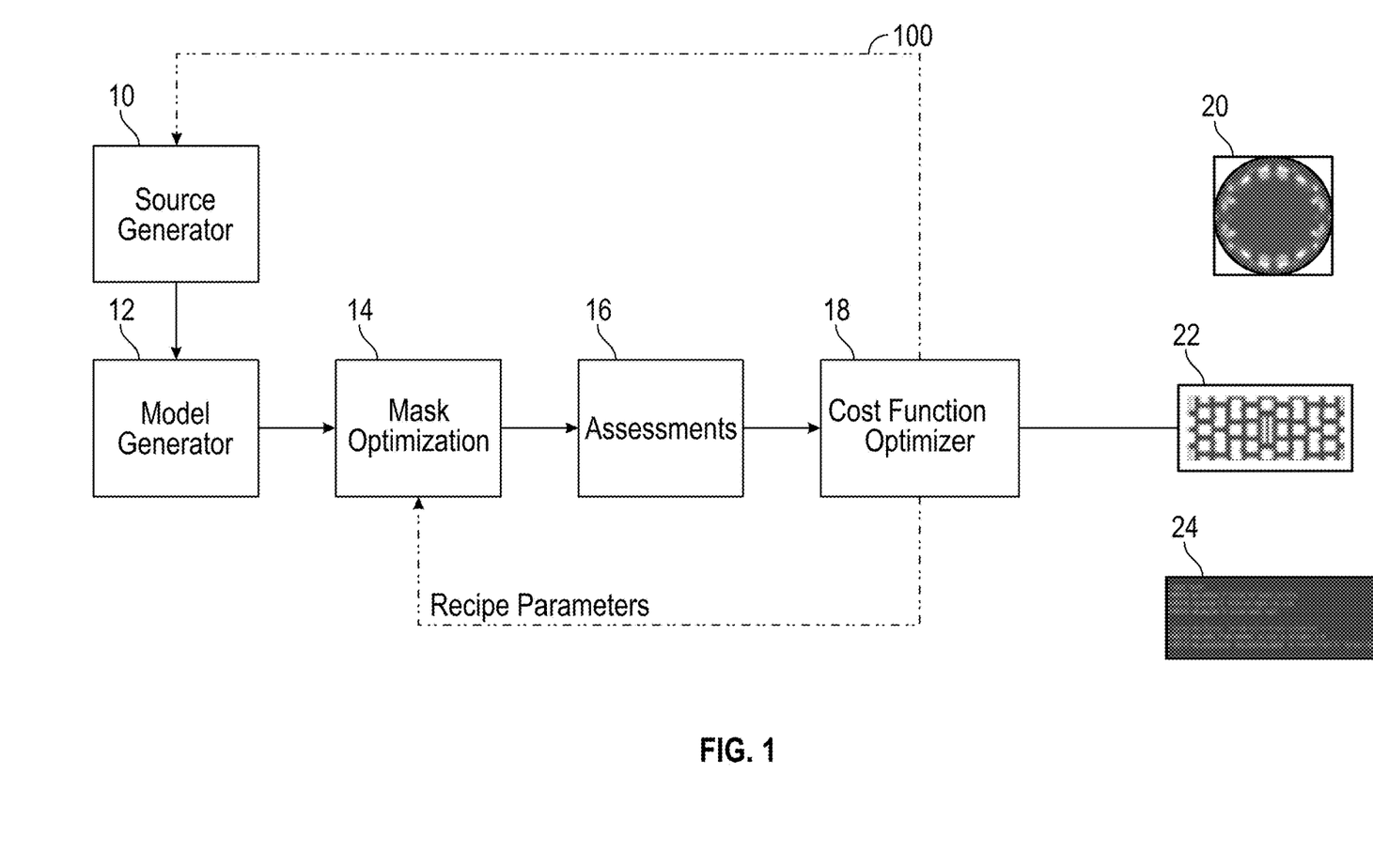
FIG. 1 shows a stochastic variance band source mask optimization flow, in accordance with one embodiment of the present application.

FIG. 1 shows a source mask optimization flow 100 adapted to account for stochastic variations by including a stochastic variance band, in accordance with one embodiment of the present disclosure. Source generator 10 is adapted to generate a source candidate (a predefined illumination pattern), which may be parametric or pixilated. A parametric source type includes shapes which can be described by a subset of parameters. A pixilated source type includes source points which are defined by positions along the x-y coordinates as well as the light intensity for the positions.

Through inclusion of stochastic processes of an SVB model in the source mask optimization, embodiments of the present disclosure provide many advantages. Among such advantages are reduced sensitivity to process variations, enhanced wafer yield, and reduced production costs.

Model generator 12 is adapted to generate a process simulation model in response to the source candidate supplied by source generator 10 as well as to the measurements of critical dimensions/patterns made on a wafer, and the photoresist effects. The model generated by model generator 12 may be a rigorous model that includes a rigorous 3-dimensional mask image data as well the photoresist effects for DUV and EUV. The model generated by model generator 12 also includes stochastic variance band (SVB) model which, in turn, includes 3-dimensional mask image data and photoresist effects. The SVB model is calibrated to account for stochastic process variations that occur in EUV scanner and the photoresist when transferring a pattern from a mask to a wafer.

Figure 2:
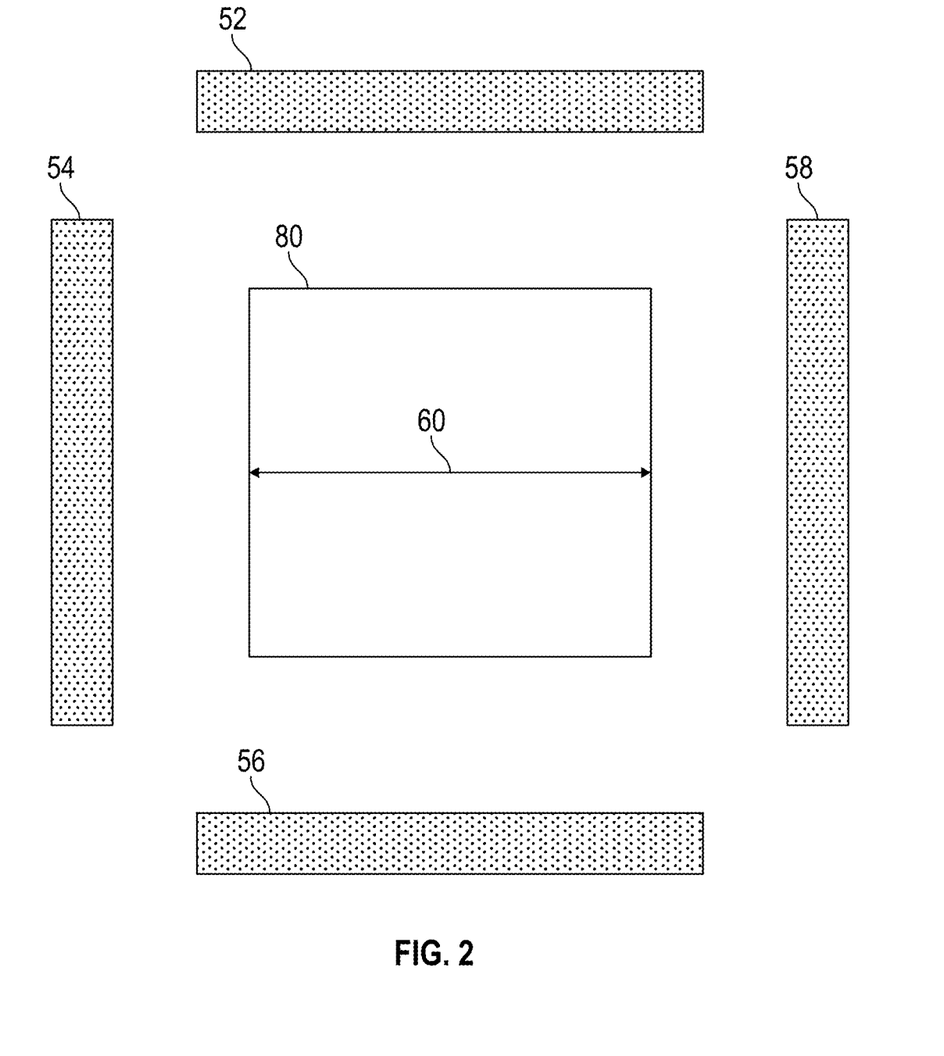
FIG. 2 shows a contact with assist features and a gauge.

Mask Optimization module 14 receives, among other things, (i) the SVB model generated by model generator 12, (ii) measurements of critical dimensions/patterns made on the wafer, and (iii) data related to the placement of assist feature (AF) and masks. In response, mask optimization module 14 performs optical proximity corrections (OPC) to generate OPC mask data. As part of the OPC correction, mask optimization module 14 may include assist features and/or printing features on the mask. FIG. 2 shows an exemplary mask contact 80, assist features 52, 54, 56, 58 disposed along outer edges of contact 80, as well as gauge 60. Contact 80 is transferred to a wafer following photoresist exposure and bake steps. Assist features 52, 54, 56, 58 are not transferred to the wafer but improve the process of transferring the contact pattern to the wafer. The coordinates of gauge 60 is used in assessing the location and direction of the contact on the wafer.

Assessment module 16 is adapted to receive the OPC mask data and compute parameters for such lithographic evaluation metrics, such as normalized image log slope (NILS), mask enhancement error factor (MEEF), depth of focus (DOF), stochastic variance edge placement error (SVEPE), Stochastic Variance Band (defined by $SVEPE_{max}-SVEPE_{min}$) by Stochastic Variance Process Window (SVPW), and the like. As is known, NILS provides a measure of the optical image quality; MEEF provides a measure of the change in the wafer CD as a function of the change in the mask CD; DOF provides a measure of process window from the degree of defocus in nanometers; and SVEPE provides a measure of the difference between a target mask edge and corresponding minimum and maximum SVB model values in nanometers. The parameters computed by assessment module 16 are determined from measured gauges. In one embodiment, a user-supplied file determines the name, location, start and end positions of each gauge selected for each site of interest. Because assessment module 16 uses the SVB data, the parameters computed by assessment module 16 enhance the optimization of the optical source and mask quality compared to conventional techniques.

Cost function optimizer 18 is adapted to determine whether a cost function determined using the parameters computed by assessment module 16 satisfy a user-defined assessment criteria. If the cost function fails to meet the assessment criteria, then a new source candidate is selected by source generator, and further OPC may be performed by mask optimization module 14. The iterative process of selecting a new source candidate and/or OPC continues until the cost function satisfies the user-defined assessment or a predetermined maximum number for iterations is reached. When the user-defined assessment is met by the cost function, an optimized source candidate 20, mask 22, as well processing recipe 24 for transferring the mask patterns to a wafer are provided.

The SVB model used by embodiments of the present disclosure provide a statistical distribution of possible minimum and maximum of CD values. The difference between the minimum and maximum values defines a stochastic band representative of the CD distribution of pattern transferred to wafer from a mask.

Figure 3:
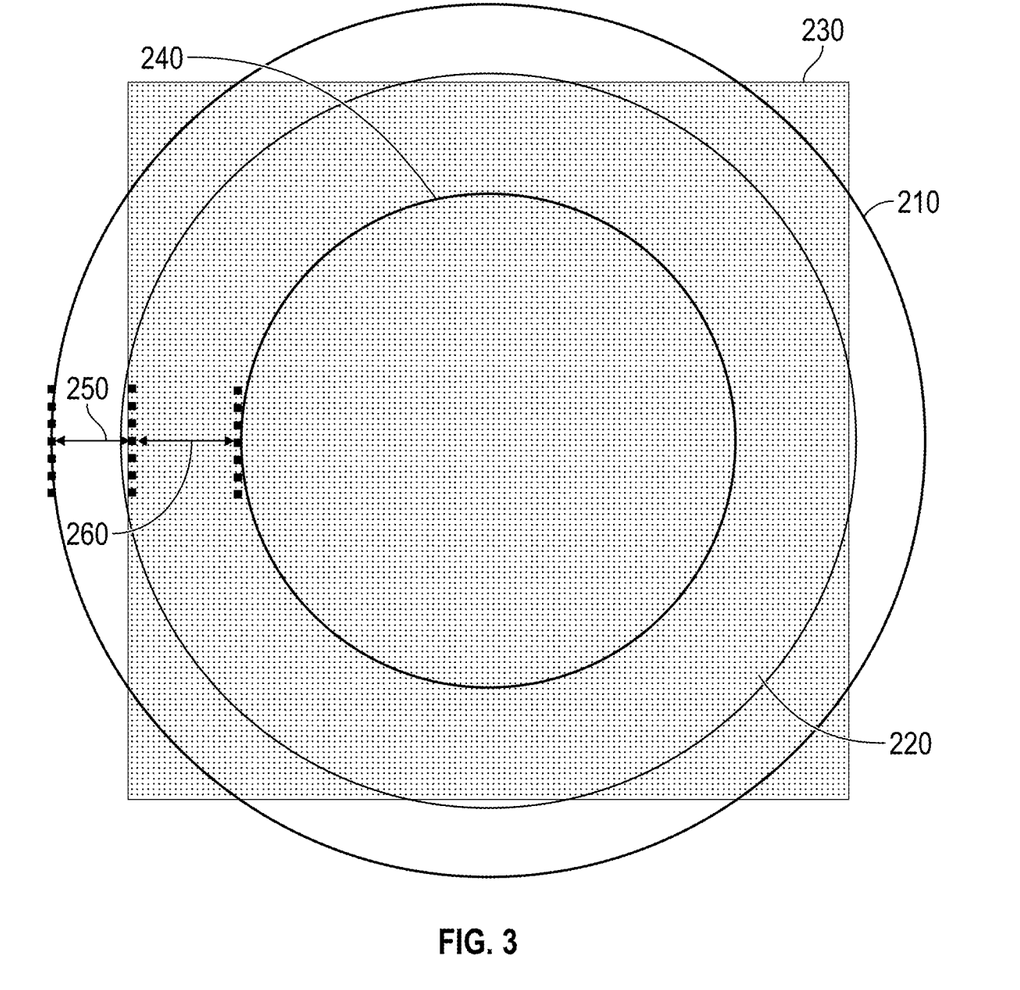
FIG. 3 shows an exemplary contact pattern as formed on a mask and transferred to a wafer.

FIG. 3 shows an exemplary rectangular contact image 230 formed on a mask from layout data. Circular line 220 shows the contours of contact image 230 as it is transferred from the mask to a wafer using a conventional lithography process. Circular lines 240 and 210 respectively show minimum and maximum contours of the contact image 230 predicted to form on wafer during a mask pattern transfer by a SVB model, in accordance with embodiments of the present disclosure. Arrow 250 shows the distance between contours 220 and 210 representing the maximum stochastic edge placement error (EPE), and arrow 260 shows the distance between contours 220 and 240 representing the minimum stochastic EPE. The stochastic variance band in this example is the difference between contours 210 and minimum 240. As seen from FIG. 3, the sum of distances 250 and 260, as predicted by the SVB mode, represents a potentially large stochastic error range even after mask optimization.

Figure 4:
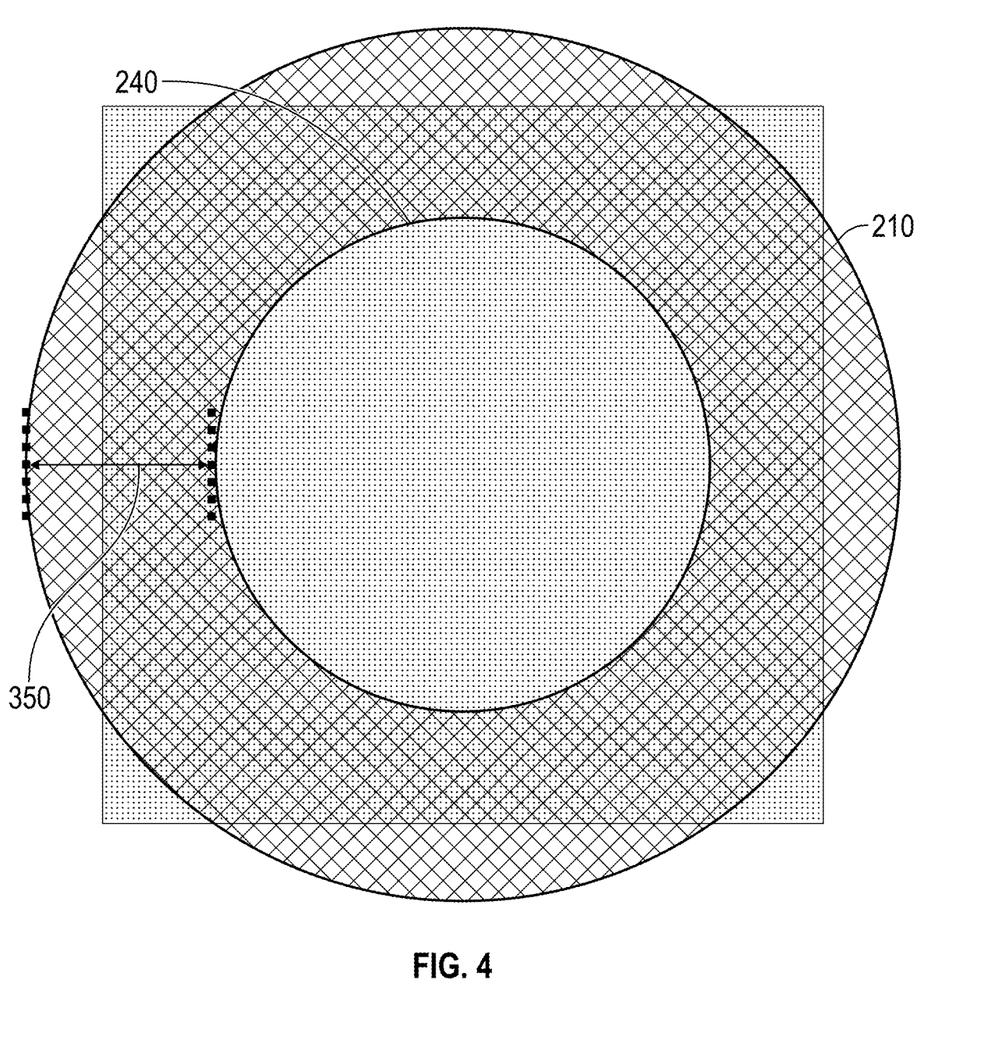
FIG. 4 shows the contours of the stochastic variance band associated with the contact of FIG. 3, in accordance with one embodiment of the present disclosure.

FIG. 4 shows contours 210 and 240 of FIG. 3 as well as SVB band 350 that is the sum of distances 250 and 260 of FIG. 3. As described above, assessment module 16 provides data representative of contours 210, 240 in, for example, in nanometers to cost function optimizer 18 to enable optimization of the source candidate (i.e., in both dose and focus) as well the mask, as described above.

Figure 5A:
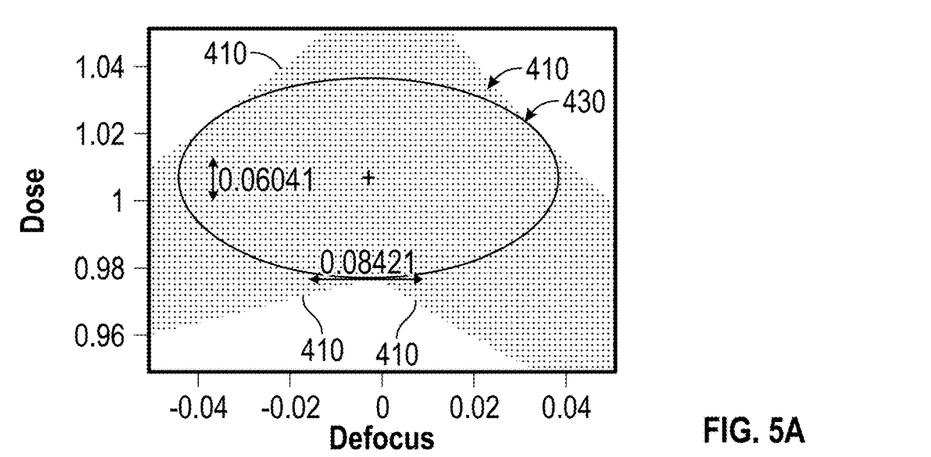
FIG. 5A shows a polygon defining an area within which exemplary measured contact CDs fall a predefined window for various optical doses and defocus ranges.

FIG. 5A shows a polygon bounded by lines 410 defining a region within which measured contact CDs fall a predefined window (e.g., less than 10% variance from the nominal CD in this example) for various optical doses and defocus ranges, as determined by assessment module 16. Ellipse 430 is the largest ellipse that fits within the boundaries of the polygon. As is seen from FIG. 5A, a maximum depth of focus of 84 nm is associated with a dose exposure latitude of 6% as measure from the center of ellipse 430.

Figure 5B:
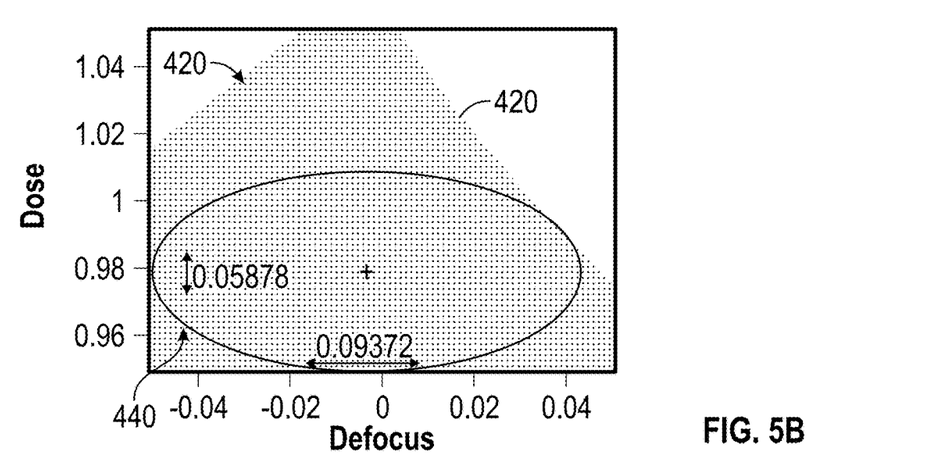
FIG. 5B shows a polygon defining an area within which computed stochastic variance bands of the contact of FIG. 5A fall within a predefined window for various optical doses and defocus ranges.

FIG. 5B shows a polygon bounded by lines 420 defining a region within which computed stochastic variance bands of the contacts fall within a predefined window (e.g., less than 6 nm from the nominal CD in this example) for various optical doses and defocus ranges, as determined by assessment module 16. Ellipse 440 is the largest ellipse that fits within the boundaries 420 of the polygon. As is seen from FIG. 5B, a maximum depth of focus of 93 nm is associated with a dose exposure latitude of nearly 5.8% as measure from the center of ellipse 440.

Figure 5C:
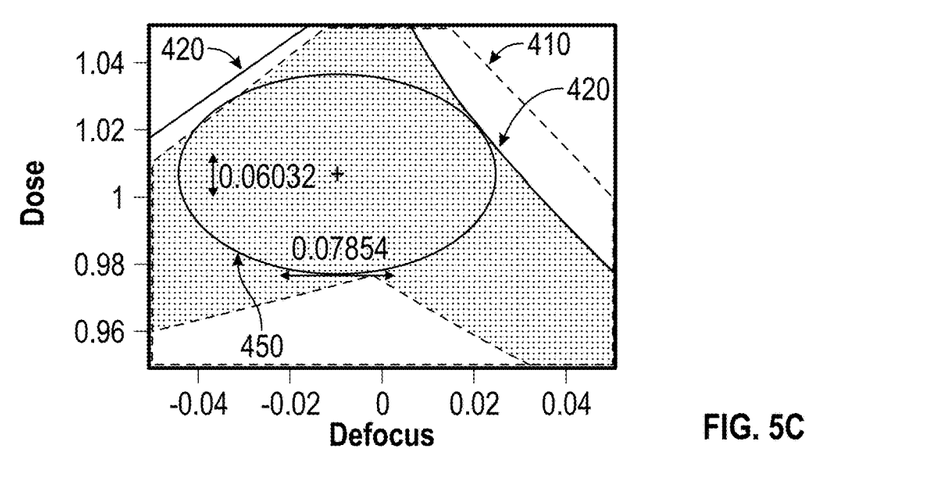
FIG. 5C shows the region defined by superimposing the polygons shown in FIGS. 5A and 5B and used in stochastic source mask optimization, in accordance with one embodiment of the present disclosure

FIG. 5C shows the superposition of the polygons of FIGS. 5A and 5B. Dashed lines 410 define the same boundary as that defined by lines 410 of FIG. 5A. Solid lines 420 define the same boundary as the as that defined by lines 420 of FIG. 5B. The shaded polygon in FIG. 5C is defined by the overlapping areas of the two polygons shown in FIGS. 5A and 5B, as determined by assessment module and supplied to cost function optimizer. Ellipse 450 is the largest ellipse that can fit within the shaded polygon of FIG. 5C. As seen from FIG. 5C, by taking the stochastic variance band, in accordance with embodiments of the present disclosure, a different set of dose and defocus (i.e., depth of focus) values is achieved. For example, a maximum depth of focus of 78 nm is associated with a dose exposure (measured in millijoules/cm2) latitude of nearly 6% as measured from the center of ellipse 450. In other words, embodiments of the present disclosure, by taking a stochastic model into computing parameters predict different sets of dose and defocus values than conventional non-stochastic optical models.

Referring to FIG. 1, cost function (CF) optimizer 18 is adapted to receive the parameters computed by assessment module 16 and calculate a cost using equation (1) shown below:

$$CF = \Sigma_{x,y}{}^o \Sigma_{E,D,M}{}^m \Sigma_{A=1}{}^n W_n(O_{E_n} + SVB_{E_n}) \quad (1)$$

In equation (1), parameter x represents the distance from the center of a site of interest to the mask end along the x-axis, parameter y represents the distance from the center of the site of interest to the mask end along the y-axis, parameter E represents the exposure dose, parameter D represent the defocus, parameter M represents the mask bias, and parameter A represents the assessment type ranging from 1 to n. parameter $W_n$ represents the weight assigned to the location of interest, parameter $O_{E_n}$, computed by assessment module 16, represents the optical assessment error (as obtained for example, by NILS, EPE, MEEF, and the like) for the site of interest.

Parameter $SVB_{E_n}$ represents the impact of the SVB model, in accordance with embodiments of the present disclosure, on the CF value. Parameter $SVB_{E_n}$ may be used at a specific dose and focus, or for as many dose and focus values in determining the stochastic variance band, as shown in FIG. 5C. As seen from equation (1), the cost function value is a weighted sum of each assessment type for each user specified site of interest. The cost associated with an SVB value is determined by comparing it to a target value in nanometers. If the CF value as computed by expression (1) is determined to be smaller than a target value, the CF value is set to zero, as shown in expression (2) below:

$$SVB_{E_n} = \text{Max}[0, (SVB \text{ value} - SVB \text{ target value})] \quad (2)$$

For example, if the SVB target value is 6 nm and the computed SVB value is 6.25 nm, the $SVB_{E_n}$ value will be 0.25. If the SVB target value is 6 nm, and the measured SVB value is 5.5 nm the $SVB_{E_n}$ value will be 0.

In Referring to equation (1), if the CF is computed to be greater than a threshold value of 0, then a different source candidate may be used to generate the mask data. If the CF is computed to be less than or equal to the threshold value of 0, the optimization has reached the CF target and is considered complete.

Figure 6A:
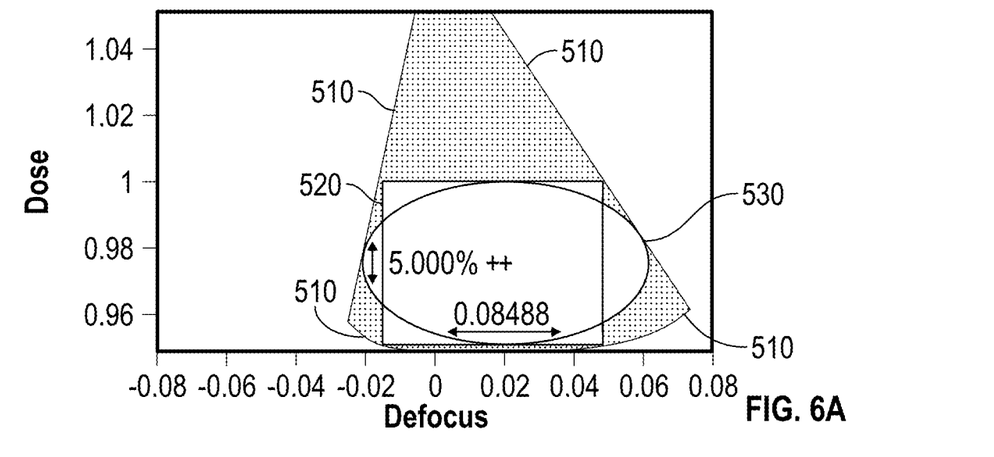
FIG. 6A shows a polygon defining an area within which exemplary line spacings as determined by an optical-only standard SMO model fall within a predefined window for various dose and defocus values.

FIG. 6A shows a polygon bounded by lines 510 defining a region within which line spacings as determined by an optical-only standard SMO model fall within a predefined window for various dose and defocus values. Also shown in FIG. 6A are the largest rectangle 520 and ellipse 530 that fit within the polygon. Table I below shows the width, height, and area of each of rectangle 520 and ellipse 530, as well as the best dose and depth of focus as determined from the centers of rectangle 520 and ellipse 530. FIG. 6D shows the source candidate used in generating FIGS. 5A and 5B. The exposure latitude is expressed in terms of percentage exposure relative to the nominal exposure dose.

TABLE I

|  | Best Defocus | Best Dose | Area | Width | Exposure Latitude |
| --- | --- | --- | --- | --- | --- |
| Rectangle | 0.01581 | 0.97531 | 0.00310 | 0.06355 | 5.000% |
| Ellipse | 0.02134 | 0.97469 | 0.00325 | 0.08488 | 5.000% |

Figure 6B:
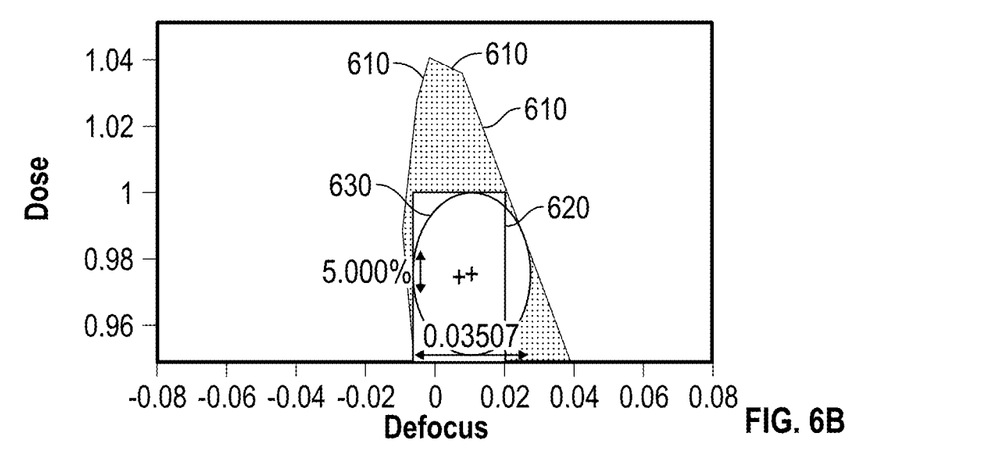
FIG. 6B shows the SMO model data of FIG. 5A assessed using a stochastic assessment, in accordance with one embodiment of the present disclosure.

FIG. 6B is similar to FIG. 6A except that in FIG. 6B a stochastic analysis, as described in accordance with embodiments of the present disclosure, is used in analyzing the same source and mask data as that which was used in FIG. 6A. The largest rectangle and ellipse that fit within the polygon bounded by lines 610 are rectangle 620 and ellipse 630. The source candidate shown in FIG. 6D was also used in generating the data shown in FIG. 6B. Table II below shows the width, height, and area of each of rectangle 620 and ellipse 630, as well as the best dose and depth of focus as determined from the centers of rectangle 620 and ellipse 630.

TABLE II

|  | Best Defocus | Best Dose | Area | Width | Exposure Latitude |
| --- | --- | --- | --- | --- | --- |
| Rectangle | 0.00763 | 0.97473 | 0.00125 | 0.02561 | 5.000% |
| Ellipse | 0.01061 | 0.97473 | 0.00134 | 0.03507 | 5.000% |

Figure 6C:
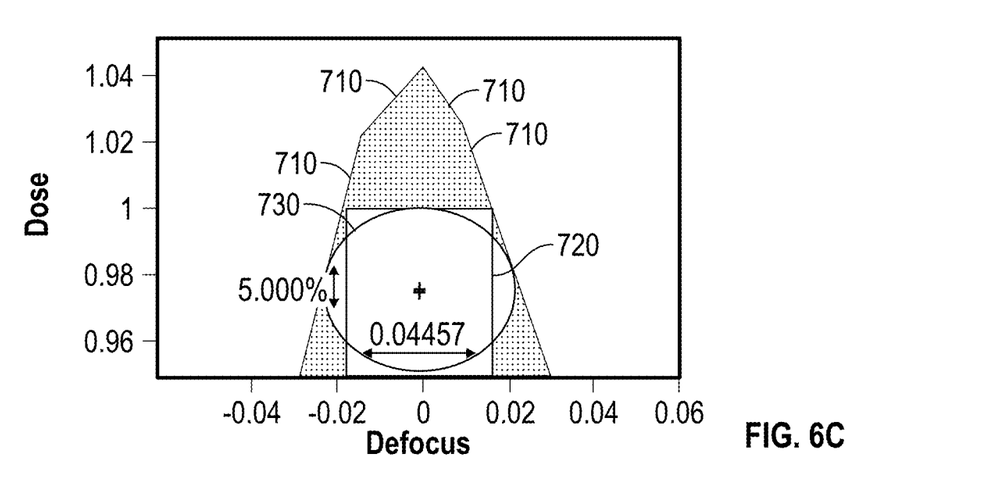
FIG. 6C shows a polygon defining an area within which computed stochastic variance bands associated with the lines spacings of FIG. 5A for various optical doses and defocus ranges are used in stochastic source mask optimization, in accordance with one embodiment of the present disclosure.
Figure 6D:
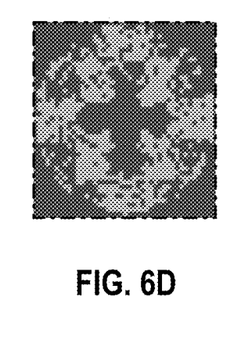
FIG. 6D shows a source candidate used in generating FIGS. 5A and 5B, in accordance with one embodiment of the present disclosure.

FIG. 6C shows a polygon bounded by lines 710 and defining a region within which the computed stochastic variance bands associated with the lines spacings fall within a predefined window for various optical doses and defocus ranges, as determined by assessment module 16. Also shown in FIG. 6C are the largest rectangle 720 and ellipse 730 that fit within the polygon. Table III below shows the width, height, and area of each of rectangle 720 and ellipse 730, as well as the best dose and depth of focus as determined from the centers of rectangle 720 and ellipse 730.

TABLE III

|  | Best Defocus | Best Dose | Area | Width | Exposure Latitude |
|---|---|---|---|---|---|
| Rectangle | −0.00096 | 0.97436 | 0.00168 | 0.03457 | 5.000% |
| Ellipse | −0.00039 | 0.97436 | 0.00173 | 0.04457 | 5.000% |

Figure 6E:
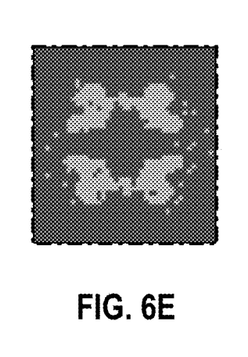
FIG. 6E shows a source candidate used in generating FIG. 5C, in accordance with one embodiment of the present disclosure.

Following the mask optimization from the data shown in FIG. 6C, the source candidate shown in FIG. 6E is selected, in accordance with embodiments of the present disclosure.

Table IV below shows various assessment types determined from the data shown in FIGS. 5B and 5C. The data from FIG. 6B is shown in column II and referred to as Optical Only SMO with Stochastic Assessment. In other words, column 2 demonstrates how the process window is affected when the stochastic variations are considered in the SMO process. The data from FIG. 6C is shown in column III and referred to as SVB SMO with Stochastic Assessments SMO. Column 4 shows the percentage improvement in performing SVB SMO, in accordance with embodiments of the present disclosure compared to conventional optical only SMO.

TABLE IV

| Assessments | Optical Only SMO with Stochastic Assessment | SVB SMO with Stochastic Assessments | SVBSMO vs Optical Only SMO |
|---|---|---|---|
| NILS | 1.493 | 1.499 | +0.4% |
| MEEF | 6.323 | 5.921 | +6.3% |
| EPEDOF (nm) | −6.246 | −3.931 | +37.1% |
| PVBAND (nm) | 6.428 | 3.775 | +41.3% |
| PPE (nm) | 1.612 | 0.908 | +43.6% |
| PVNILS | 0.947 | 1.169 | +23.4% |
| PWA(DOF)(um) | 0.035 | 0.045 | +28.6% |

As was described above, NILS stands for Normalized Image Log-Slope which is a measure (assessment) of the optical image quality computed at best dose and focus. A higher value of NILS is indicative of a sharper image. Mask Enhancement Error Factor (MEEF) is a measure of the change in the wafer CD as a function of the change in the mask CD. MEEF is also computed at the best dose and focus. The lower the value of MEEF, the higher is the image CD control. Edge Placement Error from depth of focus (EPEDOF) is a measure of the change in the edge CD as a function of a change in defocus. A smaller EPEDOF value is indicative of a better CD and a sharper image. Process Variation Band (PVBAND) is an assessment that uses multiple dose, defocus, and mask bias models to determine the maximum CD minus the minimum CD. The smaller the PVBAND value, the better is the CD control. Pattern Placement Error (PPE) is a measure of the center of a printed feature from an ideal position. The lower the PPE value, the better is the CD control. Process Variation NILS (PVNILS) is an assessment that uses multiple dose, defocus, and mask bias models to determine the lowest NILS value. The higher the PVNILS value, the better is the process window. Process Window Assessment (PWA) is an assessment that uses multiple dose, defocus, and mask bias models to determine the maximum process window. The value used from this assessment is the depth of focus (DOF). The larger the PWA value, the more ideal is the process window.

Figure 7:
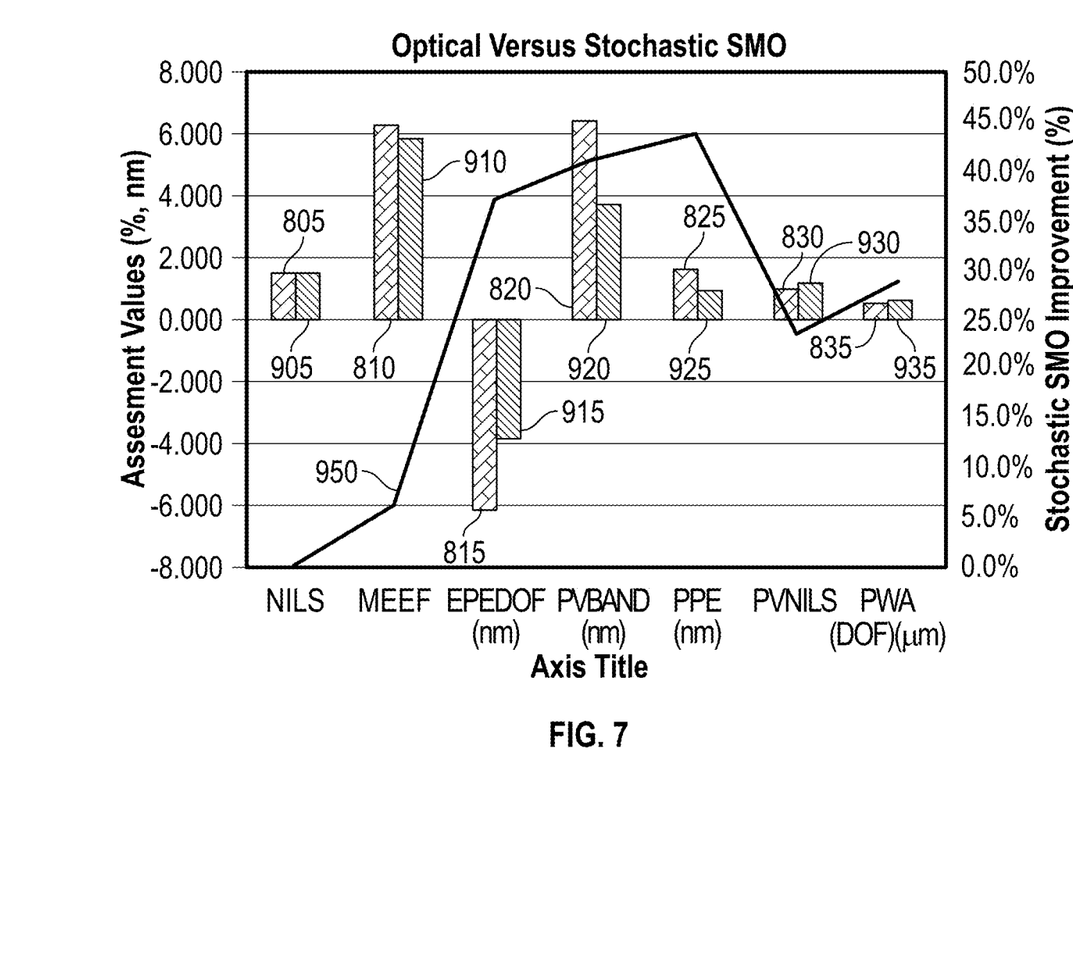
FIG. 7 is a bar chart comparing a multitude of assessment types, in accordance with one embodiment of the present disclosure.

FIG. 7 is a bar chart of the data shown in Table IV. Bars 805, 810, 815, 820, 825, 830 and 835 respectively represent the values of assessments NILS, MEEF, EPEDOF, PVBAND, PPE, PVNILS, and PWADOF, as shown in column 2 of Table IV. Bars 905, 910, 915, 920, 925, 930 and 935 respectively represent the values of assessments NILS, MEEF, EPEDOF, PVBAND, PPE, and PVNILS, and PWADOF as shown in column 3 of Table IV. Line 950 shows the percent improvement for each assessment type.

Figure 8:
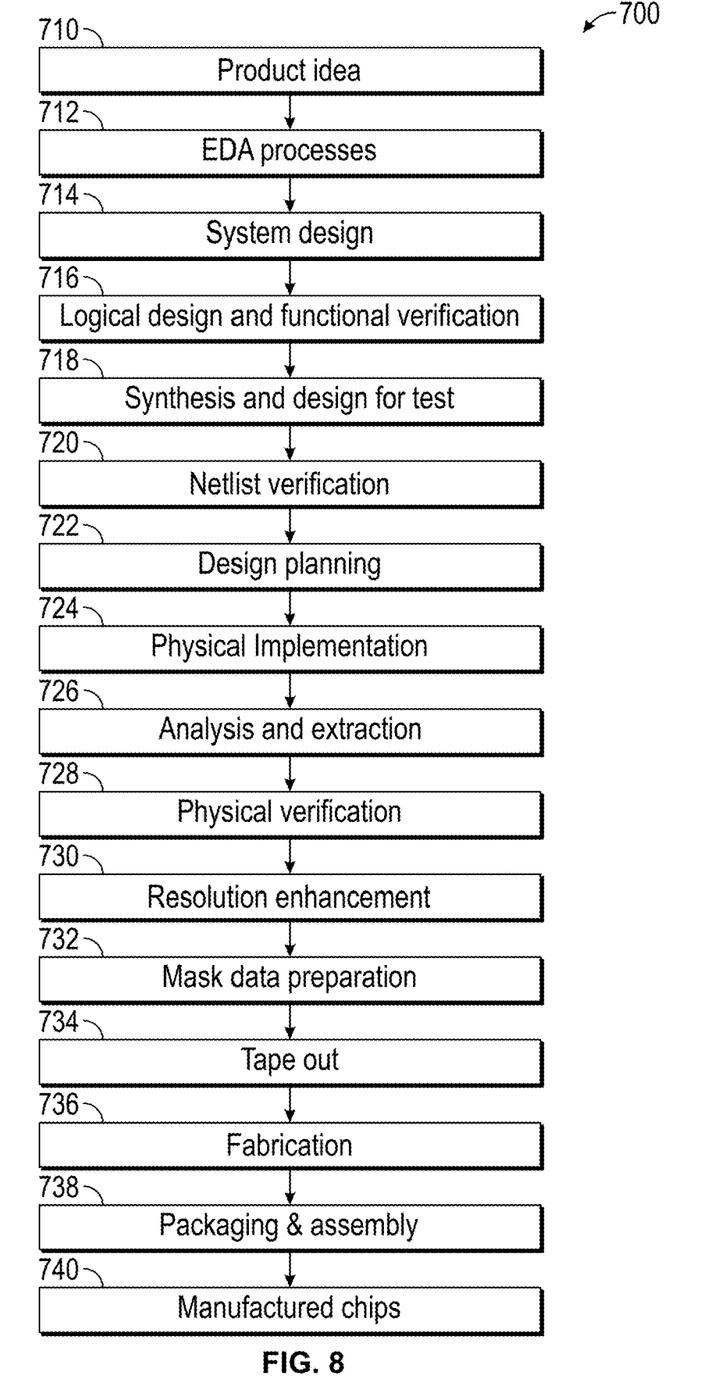
FIG. 8 shows a flowchart of various processes used during the design and manufacture of an integrated circuit, in accordance with some embodiments of the present disclosure.

FIG. 8 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level representation of a design adds more useful detail into the design description, for example, more details for the modules that include the description. The lower levels representation of a design may be generated by a computer, derived from a design library, or created by another design automation process. An example of a specification language representative of a lower level description of a design is SPICE, which is used for detailed descriptions of circuits with many analog components. Descriptions at each level of representation are enabled for use by the corresponding tools of that layer (e.g., a formal verification tool). A design process may use a sequence depicted in FIG. 8. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 7, or host system 807 of FIG. 8) may be used to store the programs and data structures that are used by some or all of the EDA products described herein, and products used for development of cells for the library and for physical and logical design that use the library.

Figure 9:
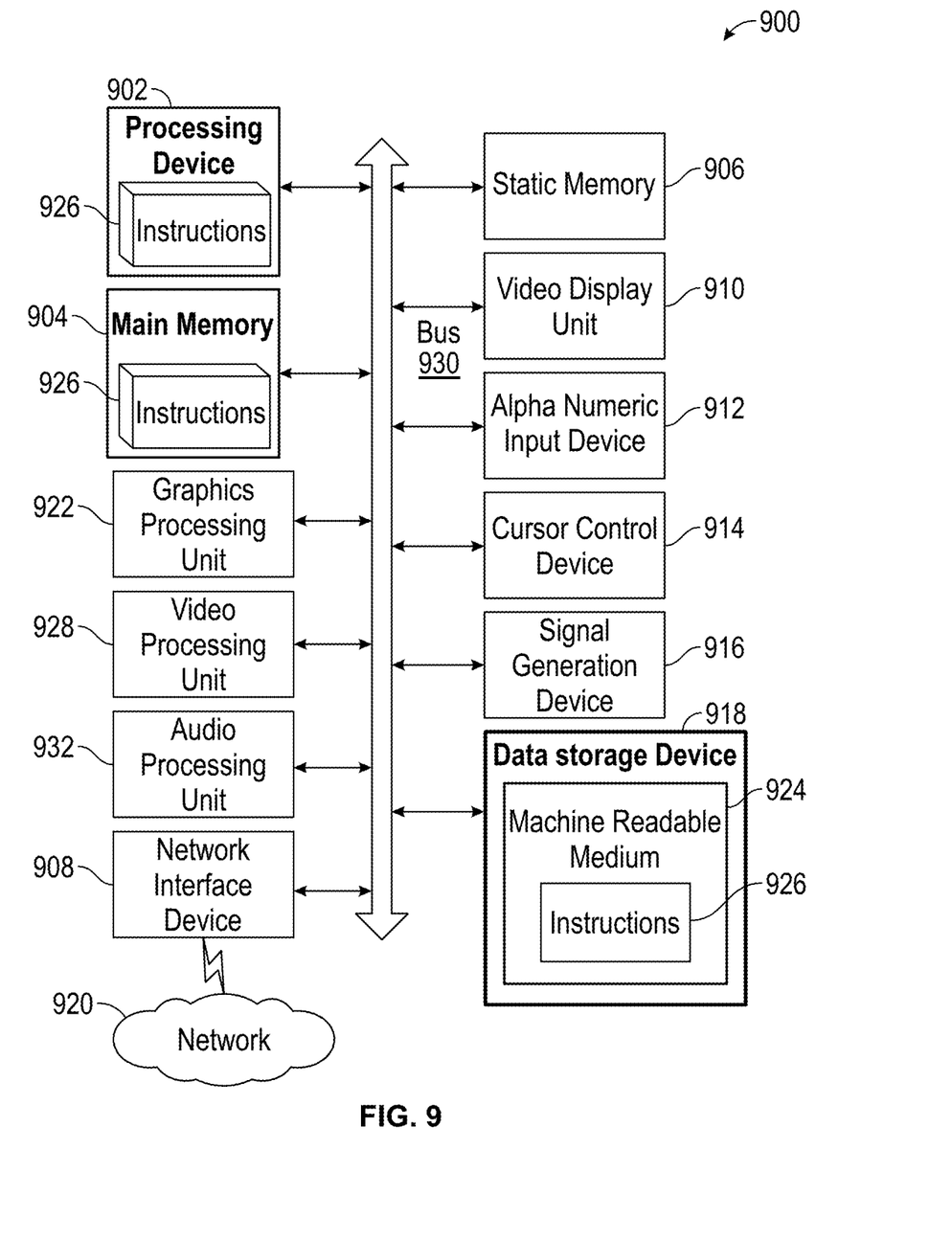
FIG. 9 shows a diagram of an example of a computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of generating a mask used in fabrication of a semiconductor device, the method comprising:
   selecting a first source candidate;
   generating a process simulation model comprising a stochastic variance band model in response to the selected source candidate;
   performing a first optical proximity correction (OPC) on data associated with the mask in response to the process simulation model;
   assessing one or more lithographic evaluation metrics in response to the OPC mask data;
   computing a cost in response to the assessed one or more lithographic evaluation metrics;
   determining whether the computed cost satisfies a threshold condition; and
   in response to determining that the computed cost does not satisfy the threshold condition, selecting a second source candidate.

2. The method of claim 1 further comprising:
   performing a second OPC on the data associated with the mask if the computed cost is greater than a threshold value.

3. The method of claim 2 further comprising:
   generating the process simulation model in response to measurements of critical dimensions on a wafer fabricated using the mask.

4. The method of claim 3 further comprising:
   generating the process simulation model in response to effects of a photoresist used to fabricate the wafer.

5. The method of claim 4 further comprising:
   performing the first optical proximity correction in response to a depth of focus of an optical source generating the source candidate.

6. The method of claim 5 further comprising:
   forming assist features on the mask.

7. The method of claim 6 further comprising:
   determining the parameters of the lithographic evaluation metrics from measurements made on gauges formed on the wafer.

8. The method of claim 1 wherein the lithographic evaluation metrics are selected from normalized image log slope, mask enhancement error factor, depth of focus, stochastic variance edge placement error, and the stochastic variance process window metrics.

9. A non-transitory computer readable storage medium comprising instructions which when executed by a processor cause the processor to:
   select a first source candidate;
   generate a process simulation model comprising a stochastic variance band model in response to the selected source candidate, perform a first optical proximity correction (OPC) on data associated with the mask in response to the process simulation model;

assess one or more lithographic evaluation metrics in response to the OPC mask data;

compute a cost in response to the assessed one or more lithographic evaluation metrics;

determine whether the computed cost satisfies a threshold condition; and in response to determining that the computed cost does not satisfy the threshold condition, select a second source candidate.

10. The non-transitory computer readable storage medium of claim 9 wherein the instructions further cause the processor to:

perform a second OPC on the data associated with the mask if the computed cost is greater than a threshold value.

11. The non-transitory computer readable storage medium of claim 10 wherein the instructions further cause the processor to:

generate the process simulation model in response to measurements of critical dimensions on a wafer fabricated using the mask.

12. The non-transitory computer readable storage medium of claim 11 wherein the instructions further cause the processor to:

generate the process simulation model in response to effects of a photoresist used to fabricate the wafer.

13. The non-transitory computer readable storage medium of claim 12 wherein the instructions further cause the processor to:

perform the first optical proximity correction in response to a depth of focus of an optical source generating the source candidate.

14. The non-transitory computer readable storage medium of claim 13 wherein the instructions further cause the processor to:

form assist features on the mask.

15. A system comprising:

a memory storing instructions; and a processor, coupled with the memory and to execute the instructions, the instructions when executed causing the processor to:

select a first source candidate;

generate a process simulation model comprising a stochastic variance band model in response to the selected source candidate, perform a first optical proximity correction (OPC) on data associated with the mask in response to the process simulation model;

assess one or more lithographic evaluation metrics in response to the OPC mask data;

compute a cost in response to the assessed one or more lithographic evaluation metrics;

determine whether the computed cost satisfies a threshold condition; and in response to determining that the computed cost does not satisfy the threshold condition, select a second source candidate.

16. The system of claim 15 wherein the instructions further cause the processor to:

perform a second OPC on the data associated with the mask if the computed cost is greater than a threshold value.

17. The system of claim 16 wherein the instructions further cause the processor to:

generate the process simulation model in response to measurements of critical dimensions on a wafer fabricated using the mask.

18. The system of claim 17 wherein the instructions further cause the processor to:

generate the process simulation model in response to effects of a photoresist used to fabricate the wafer.

19. The system of claim 18 wherein the instructions further cause the processor to:

perform the first optical proximity correction in response to a depth of focus of an optical source generating the source candidate.

20. The system of claim 19 wherein the instructions further cause the processor to:

form assist features on the mask.

* * * * *